United States Patent Office 3,850,941
Patented Nov. 26, 1974

3,850,941
2-ALKYL-3-ACYLPYRAZOLO[1,5-a]PYRIDINES
Tsutomu Irikura, Tokyo, Masayuki Hayashi, Ageo, Kikuo Koshirae and Yoshitaka Kudo, Urawa, Junji Hatayama, Kitamoto, and Etsuko Hetsugi, Urawa, Japan, assignors to Kyorin Seiyaku Kabushiki Kaisha, Tokyo, Japan
No Drawing. Filed Mar. 20, 1973, Ser. No. 343,002
Claims priority, application Japan, Mar. 30, 1972, 47/32,033
Int. Cl. C07d 31/36
U.S. Cl. 260—295 F          13 Claims

ABSTRACT OF THE DISCLOSURE

The present invention provides substituted pyrazolo [1,5-a]pyridine derivatives expressed by a compound of the general formula (I),

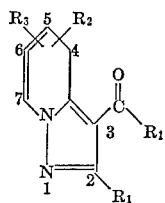
(I)

(wherein: $R_1$ is straight or branched alkyl group having from 1 to 5 carbon atoms; $R_2$ is a member of the class consisting of hydrogen and methyl radicals; and $R_3$ is a member of the class consisting of hydrogen, methyl, methoxy, halogen, acetoxy and hydroxy radicals; however, the two compounds of the general formula (I) wherein $R_1$ is methyl radical, and $R_2$ and $R_3$ are hydrogen atoms, and wherein $R_1$ is methyl radical, $R_2$ is hydrogen atom and $R_3$ is methyl radical of 7-position in pyrazolo[1,5-a]pyridine are excluded).

The substances of this invention expressed by the general formula (I) have very interesting pharmacological properties, specially coronary dilating action, cerebral dilating action, femoral dilating action, respiratory stimulating action, tracheal dilating action and hypotensive activity.

This invention relates to novel chemical compounds having especially dilating effect on coronary and cerebral arteries and more particularly to novel 2-alkyl-3-acyl-pyrazolo[1,5-a]pyridines and related compounds.

It is known from literature that pyrazolo[1,5-a]pyridine itself and several derivatives thereof have been synthesized. However, there has been no report regarding the biological activities of the pyrazolo[1,5-a]pyridine derivatives.

Then, the present inventors had studied on the preparations and physiological properties of various pyrazolo [1,5-a]pyridine derivatives and found that new compounds of the present invention had useful and unexpected pharmacological action in that they possess the following favorable action; dilating effects on coronary, cerebral and femoral arteries, and respiratory stimulating, tracheal dilating and hypotensive effect.

Concerning the synthesis of 2-alkyl-3-acylpyrazolo [1,5-a]pyridines, Potts et al. (J. Org. Chem., 33, 3766 (1968)) reported a method from 1-amino-2-methylpyridinium iodide (or 1-amino-2,6-dimethylpyridinium iodide) and acetyl chloride to produce 2-methyl-3-acetyl-pyrazolo[1,5-a]pyridine (or 2,7-dimethyl-3-acetylpyrazolo[1,5-a]pyridine) with about 20% yield. However, Potts et al. had not yet attained any commercial importance of their substance.

The compound of the present invention can be prepared by reacting the corresponding 1-amino-2-methylpyridinium salt with acyl halide according to the process disclosed by Potts et al. and more conveniently by reacting the corresponding 1-amino-2-methylpyridinium salt with acid anhydride in the presence of basic substance, found by the present inventors.

Namely, a compound of the general formula (II):

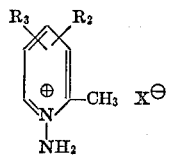
(II)

in which $R_2$ may be hydrogen or methyl, $R_3$ may be hydrogen, methyl, methoxy, halogen, acetoxy and hydroxy, X may be anion such as halogen other than fluorine, sulfate ion, arylsulfate ion such as, for example, benzenesulfonate ion, mesitylsulfonate ion, or organic acid ion such as, for example, maleic acid anion, may be reacted with two or more fold moles of a functional derivative of aliphatic acid having 2 to 6 carbon atoms such as, for example, acetic anhydride, propionic anhydride, n-butyric anhydride, isobutyric anhydride, n-valeric anhydride, isovaleric anhydride, or acyl halide such as, for example, isobutyryl chloride and so on, in the presence of a basic substance such as, for example, sodium or potassium acetate, sodium or potassium isobutyrate, sodium carbonate, potassium carbonate, triethylamine, pyridine and so on, in the presence or absence of the solvent such as, for example, pyridine, xylene, tetrachloroethane, diethoxyethane and so on, at elevated temperature, for example, 80° C. to 150° C., to prepare a compound of this invention having the general formula (I),

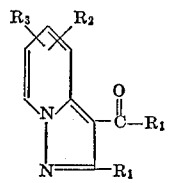
(I)

in which $R_1$ may be straight or branched alkyl group having from 1 to 5 carbon atoms, for example, methyl, ethyl, propyl, isopropyl, butyl, isobutyl, isoamyl and so on, and $R_2$ and $R_3$ are as shown hereinbefore.

In the compounds shown as the general formula (I) and synthesized by this invention, such compounds as listed in Table I showed a potent coronary flow increasing action by Langendorff method using the isolated guinea pig heart (body wt. 300–450 g.). In this experiment, coronary flow and heart rate were measured by electromagnetic flow meter and heart rate meter respectively, and 2 mg. of compounds were used as a solution dissolved in 1 ml. of 30% ethanol.

On the experiment of open chest method by Winbury et. al. (J. Pharmacol. Exptl. Therap., 99, 343 (1950)) and Schofield et al. (J. Physiol., 122, 489 (1953)) using the mongrel dogs (body wt. 8–15 kg.), KC–404, for instance, increased the coronary blood flow by about 75% or more after intra-arterial injection as compared with that of adenosine (100%), and in case of intravenous administration, KC–404 lowered blood pressure moderately soon after injection and increased coronary blood flow for longer duration than papaverine.

On the experiment of femoral blood flow measurement by the method of Hashimoto et al. (Japan, J. Physiol., 14, 299 (1964)) using mongrel dogs (body wt. 8–15 kg.), KC–404 increased femoral blood flow after intra-arterial injection by 88% as compared with adenosine (100%).

On the experiment of cerebral blood flow measurement by the method of Terasawa (Japan. Circulation J., 25, 1123 (1961)) using male rabbits (body wt. about 3 kg.), a series of invented compounds administered intravenously increased cerebral blood flow by 40% or more as compared with adenosine (100%).

Furthermore, in these invented compounds, KC-434 and KC-534, for instance, lowered the femoral arterial blood pressure of rat.

TABLE I

[Effects of the compounds shown in this invention on coronary flow and heart rate of isolated guinea pig heart (Langendorff method)]

| Compound number | Dose (α) | Coronary flow | Contractile force | Heart rate |
|---|---|---|---|---|
| KC-316 | 100 | +++ | ± | + |
|  | 200 | +++ | ± | + |
| KC-317 | 100 | + | − | ± |
|  | 200 | + | − | ± |
| KC-362 | 100 | ++ | ± | ± |
|  | 200 | +++ | ± | + |
| KC-363 | 100 | ++ | ± | ± |
|  | 200 | ++ | − | + |
| KC-364 | 100 | + | − | ± |
|  | 200 | ++ | − | + |
| KC-404 | 100 | +++ | − | + |
|  | 200 | +++ | − | ++ |
| KC-434 | 100 | +++ | − | + |
|  | 200 | +++ | − | + |
| KC-448 | 100 | ++ | ± | ± |
|  | 200 | +++ | ± | ± |
| KC-458 | 100 | ++ | ± | ± |
|  | 200 | ++ | − | ± |
| KC-493 | 100 | ++ | − | − |
|  | 200 | +++ | − | − |
| KC-502 | 100 | ++ | ± | ± |
|  | 200 | ++ | ± | − |
| KC-503 | 100 | ++ | ± | ± |
|  | 200 | +++ | ± | + |
| KC-534 | 100 | ++ | ± | ± |
|  | 200 | +++ | ± | ± |
| KC-535 | 100 | ++ | ± | ± |
|  | 200 | ++ | − | ± |
| KC-536 | 100 | + | ± | ± |
|  | 200 | ++ | ± | ± |
| KC-537 | 100 | ++ | ± | ± |
|  | 200 | ++ | − | ± |
| Papaverine | 20 | ++ | + | + |

NOTE.—+=Increase. −=Decrease.

TABLE II.—STRUCTURE AND KC-NUMBER

| KC-Number | R₁ | R₂ | R₃ |
|---|---|---|---|
| 316 | —CH₂CH₃ | H | H |
| 317 | —CH₂CH₂CH₃ | H | H |
| 362 | —CH₃ | 6=CH₃ | H |
| 363 | —CH₃ | 4-Br | H |
| 364 | —CH₃ | 6-Br | H |
| 404 | —CH(CH₃)₂ | H | H |
| 434 | —CH₂CH(CH₃)₂ | H | H |
| 448 | —CH₃ | 4-OH | H |
| 458 | —CH₃ | 4-CH₃ | H |
| 493 | —CH(CH₃)₂ | 7-CH₃ | H |
| 502 | —CH₃ | 5-CH₃ | 7-CH₃ |
| 503 | —CH₃ | 5-CH₃ | H |
| 534 | —CH₃ | 6-CH₃COO | H |
| 535 | —CH₃ | 4-CH₃O | H |
| 536 | —CH₃ | 6-OH | H |
| 537 | —CH₃ | 6-CH₃O | H |
| 541 | —CH(CH₃)₂ | 4-CH₃ | H |

For purpose of illustration only, this invention will now be illustrated by the following examples. Of course, this invention shall not be limited to the following examples.

EXAMPLE 1

Synthesis of 2-isopropyl-3-isobutyrylpyrazolo[1,5-a]pyridine (KC-404)

A mixture of 1-amino-2-methylpyridinium iodide (115 g.), isobutyric anhydride (500 g.) and $K_2CO_3$ (81 g.) was refluxed for 8 hr. After cooling, the precipitated crystals were filtered off and water was added to the filtrate. The solution was made basic to pH 11 with $K_2CO_3$ and extracted with ethyl acetate (1000 ml.). The extract was washed with water (400 ml.), dried over $Na_2SO_4$ and concentrated under reduced pressure. The residue was distilled to give 58 g. of colorless crystalline product, b.p. 110–175° (7.5 mm. Hg). Recrystallization from hexane gave colorless prisms, melting point 53.5–54°.

Analysis—
Calcd.: C, 73.01; H, 7.88; N, 12.17
Found: C, 72.86; H, 7.94; N, 12.09

In the above reaction, 1-amino-2-methylpyridinium chloride, bromide, or maleate could be used instead of the iodide with similar yield.

EXAMPLE 2

Synthesis of 2-propyl-3-butyrylpyrazolo[1,5-a]pyridine (KC-317)

A mixture of 1-amino-2-methylpyridinium iodide (149 g.), butyric anhydride (500 g.) and potassium carbonate (86 g.) was heated at 170–190° with stirring for 6 hrs. After cooling, the precipitate was collected by filtration, washed with ethyl acetate and with water. Recrystallized from ethyl acetate gave colorless needles, m.p. 87–88°.

On the other hand, the organic layer of the filtrate was separated from the water layer, concentrated under reduced pressure and to the residue was added water. The mixture, after being basified with $K_2CO_3$, was extracted with $CH_2Cl_2$. The extract was washed with water, dried over $Na_2SO_4$, and concentrated. The residue was chromatographed over alumina with $CH_2Cl_2$ as an eluent. The first fraction gave objective product as colorless needles. Total yield 70.5%.

EXAMPLE 3

Synthesis of 2-isobutyl-3-isovalerylpyrazolo[1,5-a]pyridine (KC-434)

A mixture of 1-amino-2-methylpyridinium iodide (20 g.), isovaleric anhydride (65 ml.) and $K_2CO_3$ was refluxed for 9 hrs. with stirring. The reaction mixture, after cooling, was poured into water (100 ml.) and the solution was made to pH 10 with $K_2CO_3$, extracted with $CH_2Cl_2$ (300 ml.). The extract was washed with water (100 ml.), dried over $Na_2SO_4$ and concentrated. The residue was distilled to give a product (b.p. 113–114° (7.5 mm. Hg)), which was recrystallized from hexane to colorless prisms, m.p. 53–54°. Yield 18%.

Analysis—
Calcd.: C, 74.38; H, 8.58; N, 10.84
Found: C, 74.46; H, 8.52; N, 10.84

EXAMPLE 4

Synthesis of 2-methyl-3-acetyl-4-bromopyrazolo[1,5-a]pyridine (KC-363)

1-amino-2-methyl-3-bromopyridinium chloride was worked up with the same process as shown in example 3, with acetic anhydride and anhydrous sodium acetate to prepare 2-methyl-3-acetyl-4-bromopyrazolo[1,5-a]pyridine. Recrystallization from n-hexane gave colorless prisms, melting point 86–87°.

Analysis—
Calcd.: C, 47.45; H, 3.58; N, 11.07
Found: C, 47.26; H, 3.45; N, 10.88

EXAMPLE 5

Synthesis of 2-methyl-3-acetyl-6-bromopyrazolo[1,5-a]pyridine (KC–364)

1-amino-2-methyl-5-bromopyridinium chloride was worked up with the same process as shown in example 3, with acetic anhydride and anhydrous sodium acetate to prepare 2-methyl-3-acetyl-6-bromopyrazolo[1,5-a]pyridine. Recrystallization from benzene gave colorless needles, m.p. 146–147°.

Analysis—
Calcd.: C, 47.45; H, 3.58; N, 11.07
Found: C, 47.85; H, 3.37; N, 10.68

EXAMPLE 6

Synthesis of 2,4-dimethyl-3-acetylpyrazolo[1,5-a]pyridine (KC–458)

1-amino-2,3-dimethylpyridinium iodide was worked up with the same process as shown in example 3, with acetic anhydride and anhydrous sodium acetate to prepare 2,4-dimethyl-3-acetylpyrazolo[1,5-a]pyridine (b.p. 136–141°/5 mm. Hg, yield 55.7%).

EXAMPLE 7

Synthesis of 2-methyl-3-acetyl-4-hydroxypyrazolo[1,5-a]pyridine (KC–448)

1-amino-2-methyl-3-hydroxypyridinium chloride was worked up with the same process as shown in example 3, with acetic anhydride and anhydrous sodium acetate, to prepare 2-methyl-3-acetyl-4-hydroxypyrazolo[1,5-a]pyridine. Recrystallization from ethyl acetate gave colorless needles, m.p. 117–119°.

Analysis—
Calcd.: C, 63.15; H, 5.30; N, 14.73
Found: C, 63.20; H, 5.24; N, 14.79

EXAMPLE 8

Synthesis of 2,6-dimethyl-3-acetylpyrazolo[1,5-a]pyridine (KC–362)

1-amino-2,5-dimethylpyridinium iodide was worked up with the same process as shown in example 3, with acetic anhydride and anhydrous sodium acetate to prepare 2,6-dimethyl-3-acetylpyrazolo[1,5-a]pyridine. Recrystallization from n-hexane yielded 68% of colorless needles. M.p. 141–142°.

Analysis—
Calcd.: C, 70.19; H, 6.43; N, 14.88
Found: C, 70.67; H, 6.21; N, 14.88

EXAMPLE 9

Synthesis of 2-ethyl-3-propionylpyrazolo[1,5-a]pyridine (KC–316)

1-amino-2-methyl-pyridinium iodide was worked up with the same process as shown in example 3, with propionic anhydride and anhydrous pyridine. Recrystallization from ethyl acetate gave colorless needles. M.p. 105.5–106°.

Analysis—
Calcd.: C, 71.26; H, 6.98; N, 13.85
Found: C, 71.20; H, 7.02; N, 13.82

EXAMPLE 10

Synthesis of 2-isopropyl-3-isobutyryl-7-methylpyrazolo[1,5-a]pyridine (KC–493)

A mixture of 1-amino-2,6-dimethylpyridinium iodide (73 g.), isobutyric anhydride (250 g.) and $K_2CO_3$ (40 g.) in pyridine (250 g.) was refluxed for 13 hr. and the reaction mixture was concentrated under reduced pressure. Water was added to the residue and the mixture was made basic to pH 10 with $K_2CO_3$, extracted with $CH_2Cl_2$ (1000 ml.). The extract was washed with water (400 ml.), dried over $Na_2SO_4$ and concentrated. The residue was distilled (b.p. 169–172°/5 mm. Hg) to give 27 g. of objective product.

EXAMPLE 11

Synthesis of 2-isopropyl-3-isobutyryl-4-methylpyrazolo[1,5-a]pyridine (KC–541)

1-amino-2,3-dimethylpyridinium iodide was worked up with the same process as shown in example 10 to prepare 2-isopropyl-3-isobutyryl-4-methylpyrazolo[1,5-a]pyridine (b.p. 145–150°/6 mm. Hg).

EXAMPLE 12

Synthesis of 2,5,7-trimethyl-3-acetylpyrazolo[1,5-a]pyridine (KC–502)

1-amino-2,4,6-trimethylpyridinium iodide was worked up with the same process as shown in example 1, with acetic anhydride and $K_2CO_3$ to prepare 2,5,7-trimethyl-3-acetylpyrazolo[1,5-a]pyridine (b.p. 178–184°/7 mm. Hg). Recrystallization from benzene-hexane gave colorless prisms, m.p. 108–109°.

Analysis—
Calcd.: C, 71.26; H, 6.98; N, 13.85
Found: C, 71.05; H, 6.78; N, 13.89

EXAMPLE 13

Synthesis of 2,5-dimethyl-3-acetylpyrazolo[1,5-a]pyridine (KC–503)

1-amino-2,4-dimehtylpyridinium iodide was worked up with the same process as shown in example 1 with acetic anhydride and $K_2CO_3$ to prepare 2,5-dimethyl-3-acetylpyrazolo[1,5-a]pyridine (b.p. 153–165°/6 mm. Hg). Recrystallization from ethanol gave colorless needles, m.p. 130–131°.

Analysis—
Calcd.: C, 70.18; H, 6.43; N, 14.88
Found: C, 70.06; H, 6.32; N, 14.86

EXAMPLE 14

Synthesis of 2-methyl-3-acetyl-4-methoxypyrazolo[1,5-a]pyridine (KC–535)

1-amino-2-methyl-3-methoxypyridinium iodide was worked up with the same process as shown in example 1, with acetic anhydride and sodium acetate, to prepare objective product, which was recrystallized from hexane to pale yellow needles, m.p. 107–108°.

Analysis—
Calcd.: C, 64.69; H, 5.92; N, 13.72
Found: C, 64.84; H, 5.74; N, 13.95

EXAMPLE 15

Synthesis of 2-methyl-3-acetyl-6-methoxypyrazolo[1,5-a]pyridine (KC–537)

1-amino-2-methyl-5-methoxypyridinium iodide was worked up with the same process as shown in example 1, with acetic anhydride and sodium acetate, to prepare 2-methyl-3-acetyl-6-methoxypyrazolo[1,5-a]pyridine, which was recrystallized from hexane to give colorless needles, m.p. 123°.

Analysis—
Calcd.: C, 64.69; H, 5.92; N, 13.72
Found: C, 64.61; H, 6.02; N, 13.92

EXAMPLE 16

Synthesis of 2-methyl-3-acetyl-6-acetoxypyrazolo[1,5-a]pyridine (KC–534)

1-amino-2-methyl-5-hydroxypyridinium iodide was worked up with the same process as shown in example 1, with acetic anhydride and sodium acetate, to prepare the objective product, which was recrystallized from benzene to colorless needles, m.p. 173°.

Analysis—
  Calcd.: C, 62.06; H, 5.21; N, 12.06
  Found: C, 61.94; H, 5.13; N, 12.07

EXAMPLE 17

Synthesis of 2-methyl-3-acetyl-6-hydroxypyrazolo[1,5-a]pyridine (KC–536)

A solution of 2.3 g. of 2-methyl-3-acetyl-6-acetoxy-pyrazolo[1,5-a]pyridine in 20 ml. of aqueous 30% HCl was warmed on steam bath for 1 hr. and then water was added to the reaction mixture. After standing overnight at room temperature, the precipitated crystals were collected by filtration, recrystallized from methanol to colorless needles, m.p. 207°.

Analysis—
  Calcd.: C, 63.15; H, 5.30; N, 14.73
  Found: C, 63.39; H, 5.30; N, 14.52

What is claimed is:
1. 2-Isopropyl-3-isobutyryl-pyrazolo[1,5-a]pyridine.
2. 2-n-Propyl-3-n-butyryl-pyrazolo[1,5-a]pyridine.
3. 2-Isobutyl-3-isovaleryl-pyrazolo[1,5-a]pyridine.
4. 2-Methyl-3-acetyl-4-bromo-pyrazolo[1,5-a]pyridine.
5. 2-Methyl-3-acetyl-6-bromo-pyrazolo[1,5-a]pyridine.
6. 2-Methyl - 3 - acetyl-4-hydroxy-pyrazolo[1,5-a]pyridine.
7. 2-Ethyl-3-propionyl-pyrazolo[1,5-a]pyridine.
8. 2-Isopropyl-3-isobutyryl - 7 - methyl-pyrazolo[1,5-a]pyridine.
9. 2-Isopropyl-3-isobutyryl - 4 - methyl-pyrazolo[1,5-a]pyridine.
10. 2-Methyl-3-acetyl - 4 - methoxy-pyrazolo[1,5-a]pyridine.
11. 2 - Methyl - 3 - acetyl - 6 - methoxy-pyrazolo[1,5-a]pyridine.
12. 2-Methyl - 3 - acetyl-6-acetoxy - pyrazolo[1,5-a]pyridine.
13. 2-Methyl - 3 - acetyl-6-hydroxy - pyrazolo[1,5-a]pyridine.

References Cited

UNITED STATES PATENTS 3,718,656  2/1973  Okamoto et al. ____ 260—295 F

OTHER REFERENCES

Potts et al., J. Org. Chem., vol. 33 (10), October 1968, QD 241 J.6.

ALAN L. ROTMAN, Primary Examiner

U.S. Cl. X.R.

260—296 H, 296 R; 424—263, 266